United States Patent
Kuo et al.

(10) Patent No.: US 10,985,600 B2
(45) Date of Patent: Apr. 20, 2021

(54) EMERGENCY LIGHTING SYSTEM WITH INTEGRATED TESTING AND REPORTING FUNCTIONALITY

(71) Applicant: Magtech Industries Corporation, Las Vegas, NV (US)

(72) Inventors: Michael Kuo, Las Vegas, NV (US); Jun Wang, Las Vegas, NV (US)

(73) Assignee: Magtech Industries Corporation, Las Vegas, NV (US)

( * ) Notice: Subject to any disclaimer, the term of this patent is extended or adjusted under 35 U.S.C. 154(b) by 358 days.

(21) Appl. No.: 15/657,505

(22) Filed: Jul. 24, 2017

(65) Prior Publication Data

US 2019/0027958 A1   Jan. 24, 2019

(51) Int. Cl.

| | |
|---|---|
| H02J 9/06 | (2006.01) |
| H05B 47/21 | (2020.01) |
| H04L 29/08 | (2006.01) |
| G08B 5/36 | (2006.01) |
| H02J 7/00 | (2006.01) |
| G08B 7/06 | (2006.01) |
| H05B 47/20 | (2020.01) |

(Continued)

(52) U.S. Cl.
CPC .............. *H02J 9/06* (2013.01); *G08B 7/062* (2013.01); *H02J 7/0021* (2013.01); *H05B 47/20* (2020.01); *H05B 47/22* (2020.01); *F21S 9/022* (2013.01); *G08B 5/36* (2013.01); *G08B 29/10* (2013.01); *G08B 29/126* (2013.01); *H04L 67/12* (2013.01)

(58) Field of Classification Search
CPC . H02J 9/06; H02J 7/0021; F21S 9/022; G08B 5/36; G08B 29/10; G08B 29/126; G08B 7/062; H04L 67/12; H05B 37/03

USPC ........ 324/403, 409–411, 500, 536, 600, 678, 324/76.11, 76.32, 76.34, 76.65–76.67, 87
See application file for complete search history.

(56) References Cited

U.S. PATENT DOCUMENTS 5,929,781 A * 7/1999 Vosika ................ G08B 29/126
                                                         315/134
9,398,649 B2   7/2016 Wang
(Continued)

FOREIGN PATENT DOCUMENTS

CN     101103385 A    1/2008
CN     101583218 A    11/2009
(Continued)

OTHER PUBLICATIONS

Lithonia Lighting, Trial Installation Program, Jul. 2012, lithonia.acuitybrands.com/Libraries/FIDO/FIDO_TIP-flier.sflb.ash.
(Continued)

*Primary Examiner* — Melissa J Koval
*Assistant Examiner* — Trung Q Nguyen
(74) *Attorney, Agent, or Firm* — Lightbulb IP, LLC

(57) ABSTRACT

An emergency lighting system provides testing and reporting functionality in a rapidly repeatable fashion for environments with numerous emergency lighting units. In one or more embodiments, the emergency lighting system comprises a plurality of emergency lighting units capable of conducting one or more tests and reporting their operating condition as test results. One or more terminals receive and aggregate the test results and present the same to a user. Emergency lighting units having an undesirable operating condition can then be readily identified and addressed.

14 Claims, 6 Drawing Sheets

(51) Int. Cl.
*F21S 9/02* (2006.01)
*G08B 29/12* (2006.01)
*G08B 29/10* (2006.01)

(56) References Cited

U.S. PATENT DOCUMENTS

| | | | |
|---|---|---|---|
| 2002/0080027 A1 | 6/2002 | Conley | |
| 2006/0139161 A1 | 6/2006 | Beghelli | |
| 2011/0053492 A1* | 3/2011 | Hochstein | H04B 7/14 |
| | | | 455/7 |
| 2012/0245880 A1 | 9/2012 | Nabrotzky | |
| 2013/0157559 A1* | 6/2013 | Flammer, III | G08B 21/12 |
| | | | 455/7 |
| 2013/0193847 A1* | 8/2013 | Recker et al. | H05B 37/03 |
| | | | 315/86 |

FOREIGN PATENT DOCUMENTS

| | | |
|---|---|---|
| CN | 102707200 A | 10/2012 |
| CN | 102740558 A | 10/2012 |
| CN | 106471868 A | 3/2017 |

OTHER PUBLICATIONS

Philips Emergency Lighting, Selecting & Applying Emergency Lighting Systems, 2010, Philips Emergency Lighting, Collierville, TN.

Schatz, Glenn, The Complete List of Wireless IoT Network Protocols, Feb. 2016, LinkLabs, https://www.link-labs.com/blog/complete-list-iot-network-protocols.

Schneider Electric, Dardo Plus, Jun. 2016, Schneider Electric, France.

Controlled Power Company, Centralized Emergency Lighting Inverters, Apr. 2017, Controlled Power Company, Troy, MI.

Schneider Electric, Exiway DiCube, May 2017, Schneider Electric, France.

Emergency Lighting Products Ltd., DALI and Self-Test, 2017, Emergency Lighting Products Ltd., United Kingdom, http://www.elp.uk.com/dali-and-self-test/.

Tridonic GmbH & Co KG, LED emergency lighting system, Mar. 2017, Tridonic GmbH & Co KG, Austria.

* cited by examiner

EMERGENCY LIGHTING SYSTEM WITH INTEGRATED TESTING AND REPORTING FUNCTIONALITY

BACKGROUND OF THE INVENTION

Field of the Invention

The invention relates to lighting systems and in particular to an emergency lighting system with integrated testing and reporting functionality.

Related Art

Lighting is important for providing illumination to an environment, especially where the environment would otherwise be dark. Without lighting, occupants of an environment could have great difficulty conducting their affairs. This is especially the case in the event of an emergency. Even properly installed lighting can fail for a variety of reasons.

From the discussion that follows, it will become apparent that the present invention addresses the deficiencies associated with the prior art while providing numerous additional advantages and benefits not contemplated or possible with prior art constructions.

SUMMARY OF THE INVENTION

An emergency lighting system is disclosed herein. The emergency lighting system provides testing and reporting functionality for environments with numerous emergency lighting units, such as commercial, industrial, or retail environments. The testing and reporting functionality rapidly identifies undesirable operating conditions at a plurality of emergency lighting units, allowing such operating conditions to be addressed. In addition, tests and test reports can be repeatedly generated to help ensure the emergency lighting units are operational should an emergency occur.

Various embodiments of an emergency lighting system are disclosed herein. In one exemplary embodiment, an emergency lighting system comprises one or more terminals that send one or more start commands and receive a plurality of test results via one or more communication devices, and a plurality of individual power systems for a plurality of lighting devices.

Each power system comprises a fixture identifier, one or more power supplies that receive power from a power source, one or more batteries, one or more communication devices that receive the start commands, one or more switches that actuate upon receipt of the start commands, and one or more sensors that determine an operating condition of the plurality of lighting devices after the switches are actuated.

The communication devices transmit a test result comprising the operating condition and the fixture identifier to the terminals. The terminals present the plurality of test results to a user after the plurality of test results are received as well. The sensors may also determine an operating condition of the batteries.

It is contemplated that the terminals may present the plurality of test results on a display, output the plurality of test results via a printer, or both. The operating condition may be a normal operating condition, a warning operating condition, a failure operating condition, or an unknown operating condition.

One or more storage devices may be included as well. The terminals store the plurality of test results in a database on the storage devices. The plurality of emergency lighting units may also comprise one or more controllers that validate the start commands.

In another exemplary embodiment, an emergency lighting system for a building is disclosed, with such emergency lighting system comprising a plurality of individual power systems for a plurality of lighting devices, and one or more terminals comprising a display.

Each of the power systems comprise one or more batteries, one or more communication devices that receive one or more start commands, one or more switches that actuate upon receipt of the start commands, and one or more sensors that determine an operating condition of the lighting devices after the switches are actuated. The operating condition may be a normal operating condition, a warning operating condition, a failure operating condition, or an unknown operating condition.

The communication devices transmit a test result comprising the operating condition and the fixture identifier. The terminals receive and present a plurality of test results once a plurality of test results have been received.

The terminals may transmit the start commands, output the plurality of test results via a printer, or both. In addition, the plurality of emergency lighting units may have a power supply in electrical communication with the batteries. The terminals may store the plurality of test results in a database on one or more storage devices of the emergency lighting system. The plurality of emergency lighting units may include one or more controllers that validate the start commands as well.

Various methods are disclosed herein as well. For instance, in one exemplary method, emergency lighting is provided with an emergency lighting system having a plurality of power systems for a plurality of lighting devices. Each of the power systems comprise a fixture identifier, one or more switches, and one or more communication devices.

The method includes receiving one or more start commands at the communication devices, actuating the switches in response to receipt of the start commands, determining an operating condition of the plurality of lighting devices via the sensors after the switches are actuated, and transmitting a test result comprising the fixture identifier and the operating condition from the communication devices of each of the plurality of lighting devices. After a plurality of test results are transmitted, the plurality of test results are presented at one or more terminals. The operating condition may be a normal operating condition, a warning operating condition, a failure operating condition, or an unknown operating condition.

It is contemplated that the start commands may be transmitted from the terminals. The plurality of test results may be stored in one or more databases. In addition, the start commands may be validated with a controller of the plurality of emergency lighting units. The switches may activate the lighting devices when actuated as well.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the prin

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The emergency lighting system herein has integrated testing and reporting functionality, which is advantageous for discovering failure conditions at individual lighting elements before the emergency lighting system is needed, and readily identifying whether the emergency lighting system and the lighting and other elements thereof are functional or in a failure condition. This is especially useful in setting with a multitude of emergency lighting units, such as for example, a hotel, factory, office, store, apartment building, or other residential, commercial, or industrial facility.

Traditionally, testing of emergency lighting units is a time-consuming process whereby individual lighting fixtures are manually tested according to a periodic schedule, as may be defined or required by local regulations. In facilities having a large number of emergency lighting units, this can be a time-consuming and expensive endeavor. In addition, the potential exists for a failure to occur immediately after a test and thereby be left undiscovered until the next test. The emergency lighting system herein provides rapid testing and reporting for emergency lighting units in an automated fashion, that can also be rapidly repeated at little cost.

Figure 1:
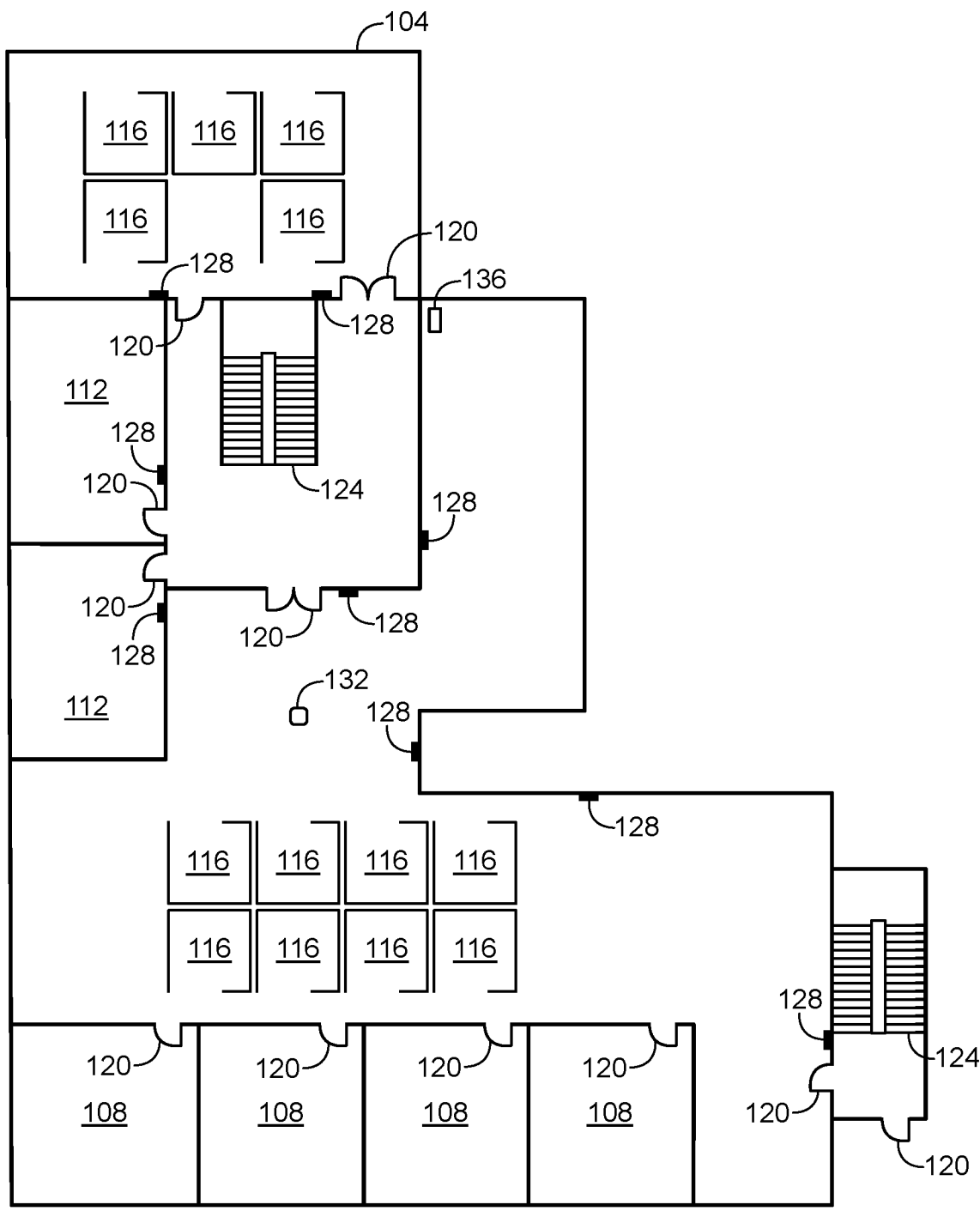
- FIG. 1 is a block diagram illustrating an exemplary emergency lighting system in an environment of use.

FIG. 1 illustrates an embodiment of an emergency lighting system in an exemplary environment of use. As can be seen, the exemplary environment 104 is an office having a number of offices 108, restrooms 112, and cubicles 116. Doors 120 provide for ingress and egress into and out of these areas. In addition, stairs 124 provide an emergency exit from this exemplary office 104, in the event of an emergency. It is contemplated that an environment may be an indoor or outdoor area and may comprise a plurality of indoor or outdoor areas in some embodiments.

An emergency lighting system may comprise a plurality of emergency lighting units 128 installed at various locations. Ideally, emergency lighting units 128 will be located where they can best inform or alert occupants as to emergency conditions and the location of an emergency exit, such as with directional indicators, signage or other indicators. As can be seen, an emergency lighting unit 128 is located in every area of the exemplary environment 104 of FIG. 1. In this manner, occupants of various areas of the environment 104 can readily see an emergency lighting unit 128, in the event of an emergency.

In one or more embodiments, emergency lighting units 128 may optionally communicate through one or more gateways 132. In general, a gateway 132 facilitates communication between one or more emergency lighting units 128 and another device, such as a terminal 136 or another emergency lighting unit. A gateway 132 is optional since the emergency lighting units 128 may be capable of communicating directly with a terminal 136, other emergency lighting units 128, or other devices in one or more embodiments. Typically, a gateway 132 will be provided when communication with a device on another network or a device that is otherwise incapable of communicating with the emergency lighting units 128 is desired.

A gateway 132 may comprise one or more first communication devices and one or more second communication devices for such purposes. For instance, a gateway 132 may have a first communication device for communicating with one or more emergency lighting units 128 and a second communication device for communicating with one or more terminals 136. In one or more embodiments, the first communication device and second communication device may utilize distinct networks, communication links, or communication protocols.

Figure 2:
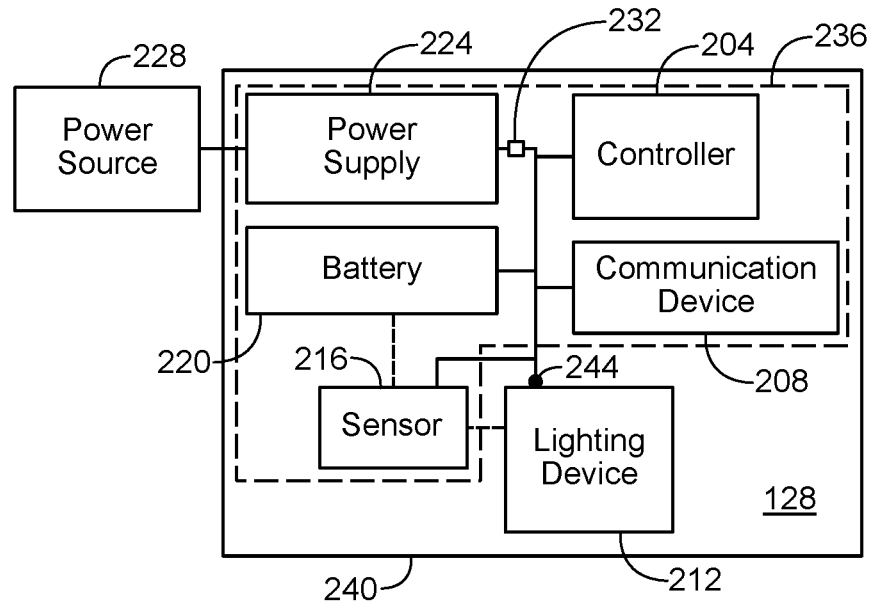
FIG. 2 is a block diagram of an exemplary emergency lighting unit.

FIG. 2 illustrates an exemplary emergency lighting unit 128. It will be understood that the components thereof may be interconnected in various ways. As can be seen, in one or more embodiments, an emergency lighting unit 128 may comprise one or more lighting devices 212 and power supplies 224, batteries 220, or both. A lighting device 212 may comprise one or more LEDs, light bulbs, or other devices that provide illumination.

One or more electrical connections 144 may be provided to connect a lighting device 212 to a power supply 224, battery 220, or other component of an emergency lighting unit 128. An electrical connection 144 may be permanent, such as a soldered connection. Alternatively, an electrical connection 144 may permit a lighting device 212 to be disconnected and reconnected, such as by providing a wire terminal, socket, outlet, or the like.

A power supply 224, battery 220, or both may be provided to power the lighting device 212. Typically, a power supply 224 will receive power from an external power source 228, such as an outlet, to power an emergency lighting unit 128. In one or more embodiments, a power supply 224 may convert input power to a voltage and amperage particular to the specifications of an emergency lighting unit 128. In addition, a power supply 224 may convert AC to DC power (or vice versa if desired).

A power supply 224 may be used to charge a battery 220 of an emergency lighting unit 128 as well. A battery 220 will typically be used as a backup power source for an emergency lighting unit 128 to power the emergency lighting unit if external power is no longer available (i.e., during a power outage). Alternatively, it is contemplated that a battery 220 may solely be used to power an emergency lighting unit 128 in some embodiments. In such embodiments, a power supply 224 need not be provided.

A controller 204 may be provided to facilitate an emergency lighting unit's testing and reporting capability. In one or more embodiments, a controller 204 may be a microprocessor or other integrated circuit that controls the operation of the components of an emergency lighting unit 128. A controller 204 may execute instructions to provide the functionality disclosed herein. Such instructions may be stored on a non-transient memory or storage device, such as a data storage drive, ROM, or the like. Alternatively, instructions may be hardwired into the controller 204, such as in an internal memory or storage device, or in the circuitry of the controller itself.

A controller 204 may also detect emergencies and activate a lighting device 212 as a result. For example, a controller 204 may detect when there is a power loss or other failure at a power supply 224 and power a lighting device 212 with a battery 220 in response to the same. Alternatively or in addition, a controller 204 may detect smoke or other contaminants, high or low temperatures, or other environmental conditions indicative of an emergency, such as via one or more sensors 216, and activate a lighting device 212 in response.

Various components of an emergency lighting unit 128 may be tested using one or more sensors 216. For example, a lighting device 212, battery 220, or both may be tested. A power supply 224, or other components of an emergency lighting unit 128, may also or alternatively be tested. Additional details regarding testing will be described below.

It is contemplated that one or more switches 232, relays, or the like may be provided in some embodiments. A switch 232 may be used to disconnect or deactivate one or more components of an emergency lighting unit 128. Typically, such functionality will be used for testing purposes. To illustrate, the switch 232 of FIG. 2 may be used to disconnect the power supply 224, such as to test function of the battery 220, lighting device 212, communication device 208, or other component of an emergency lighting unit 128 when the power supply 224 fails to provide power. Though shown associated with a power supply 224, it is contemplated that one or more switches 232 may be in electrical communication with various other components of an emergency lighting unit 128 to test the functionality of the same if one of these components is disconnected. As alluded to herein, an emergency lighting unit 128 may have duplicate components for redundancy. A switch 232 may be associated with the same to test redundant or primary components.

An emergency lighting unit 128 may have one or more enclosures 240 for housing its components. An enclosure 240 may provide a water or weathertight housing in one or more embodiments. One or more openings may be provided to permit passage of light, sound, or both from an enclosure 240.

Though described herein primarily with regard to lighting devices 212, it is contemplated that various types of output devices may be used. For example, one or more audible alarms, speakers, or the like may be provided with an emergency lighting unit 128 with or without a lighting device 212. During an emergency, a speaker or other output device may be activated in addition to or instead of a lighting device 212 in one or more embodiments. It is contemplated that an emergency lighting unit 128 may be provided in the form of a light fixture, lighted signage, alarm, or the like in one or more embodiments.

Various components of an emergency lighting unit 128 may form a power system 236. A power system 236 may power a lighting device 212 (or other output device) during an emergency, during non-emergency conditions (i.e., normal condition), or both. In addition, a power system 236 may provide testing and reporting functionality for lighting devices 212 or other components of an emergency lighting unit 128, as disclosed herein. As can be seen from FIG. 2, a power system 236 may comprise one or more power supplies 224, controllers 204, switches 232, batteries 220, communication devices 208, sensors 216, or various subsets thereof. It is contemplated that a power system 236 may be used to retrofit existing light fixtures or other devices to provide the functionality disclosed herein.

It is contemplated that a testing system may be provided in some embodiments to retrofit existing light fixtures or other devices to provide the functionality disclosed herein. In one or more embodiments, a testing system may comprise one or more controllers, 204, communication devices 208, sensors 216, or various subsets thereof. In general, a testing system would perform tests to determine and report one or more operating conditions of the light fixture or other device to which it is connected. A testing system may include a battery in some embodiments, such as to provide backup power. In one or more embodiments, a testing system may connected to an existing lighting device 212, power supply 224, or both to retrofit the same to provide the testing and reporting functionality as disclosed herein.

Figure 3:
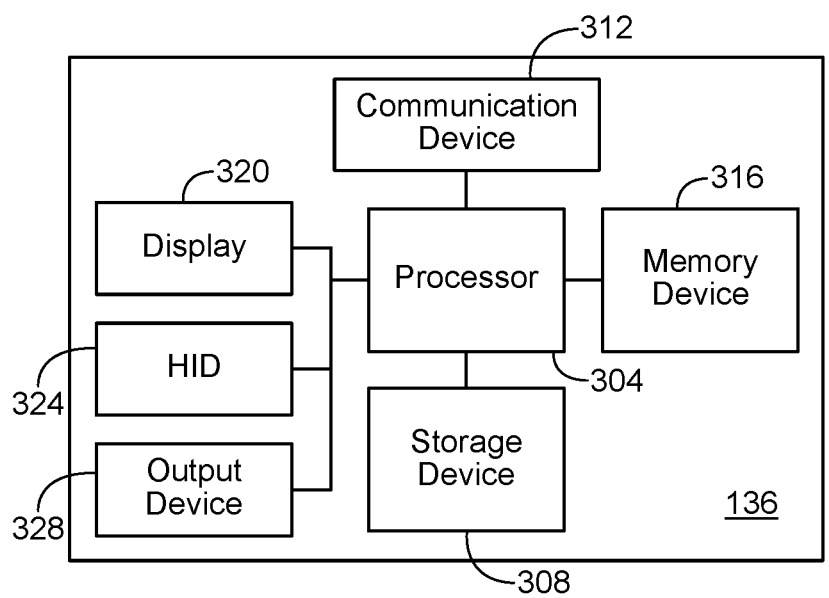
FIG. 3 is a block diagram of an exemplary terminal.

FIG. 3 illustrates an exemplary terminal 136. As discussed, a terminal 136 may receive test results and other information from one or more emergency lighting units 128. Test results may be presented to users via a terminal 136. In addition, tests may be initiated and aborted from a terminal 136 in one or more embodiments.

A terminal 136 may be a computing device in one or more embodiments, such as a computer, tablet, smartphone or the like. As can be seen from FIG. 3, a terminal 136 may comprise one or more processors 304, storage devices 308, memory devices 316, and communication devices 312. A terminal may also comprise one or more input or output devices. For example, a terminal 136 may have one or more displays 320, and HIDs (human input devices) 324. A terminal 136 may also have one or more output devices 328, such as printers or speakers.

A terminal 136 will typically execute instructions via a processor 304 to provide the functionality disclosed herein. Such instructions may be stored as machine readable code on a non-transient storage device 308 (excluding carrier waves and electronic signals transmitted via wired or wireless communication links), or be hardwired into the processor 304. Some exemplary storage devices 308 include magnetic, flash, or optical drives. Alternatively or in addition, the instructions may be hardwired into a processor 304. A terminal 136 may utilize a memory device 316, such as one or more RAM modules, for temporary storage during its operation.

Communication with one or more emergency lighting units or other devices may occur via wired or wireless connections provided by one or more communication devices 312. Some exemplary communication devices 312 include wired or wireless network interfaces/cards, transmitters, receivers, or transceivers. It is contemplated that various communication protocols, now known or later developed, may be used to facilitate communication. Some exemplary protocols include Ethernet, WIFI, BLE (BLUETOOTH Low Energy), ZIGBEE, NB-IOT, NFC, RFID, SIGFOX, WEIGHTLESS, ANT, DIGIMESH, MIWI, Z-WAVE, BACNET, LORA, and various cellular network protocols. Communication may be facilitated by one or more gateways, as described above.

One or more HIDs 324 may be included to receive user input. Some exemplary HIDs 324 include touch screens, keyboards, pointing devices, and the like. A display 320 will typically be used to present information, such as test results, to a user. Test results or other information may also or alternatively be presented via printouts, or the like, such as through a terminal's output device 328.

A terminal 136 may execute machine readable code fixed on a non-transient storage medium, such as in the form of a software application to provide the functionality herein, as will be described further below. It is contemplated that a terminal 136 may alternatively be a limited purpose testing device in one or more embodiments. For instance, in one embodiment, a terminal 136 may be a testing device only capable of initiating tests and receiving the results thereof for presentation to a user.

Figure 4:
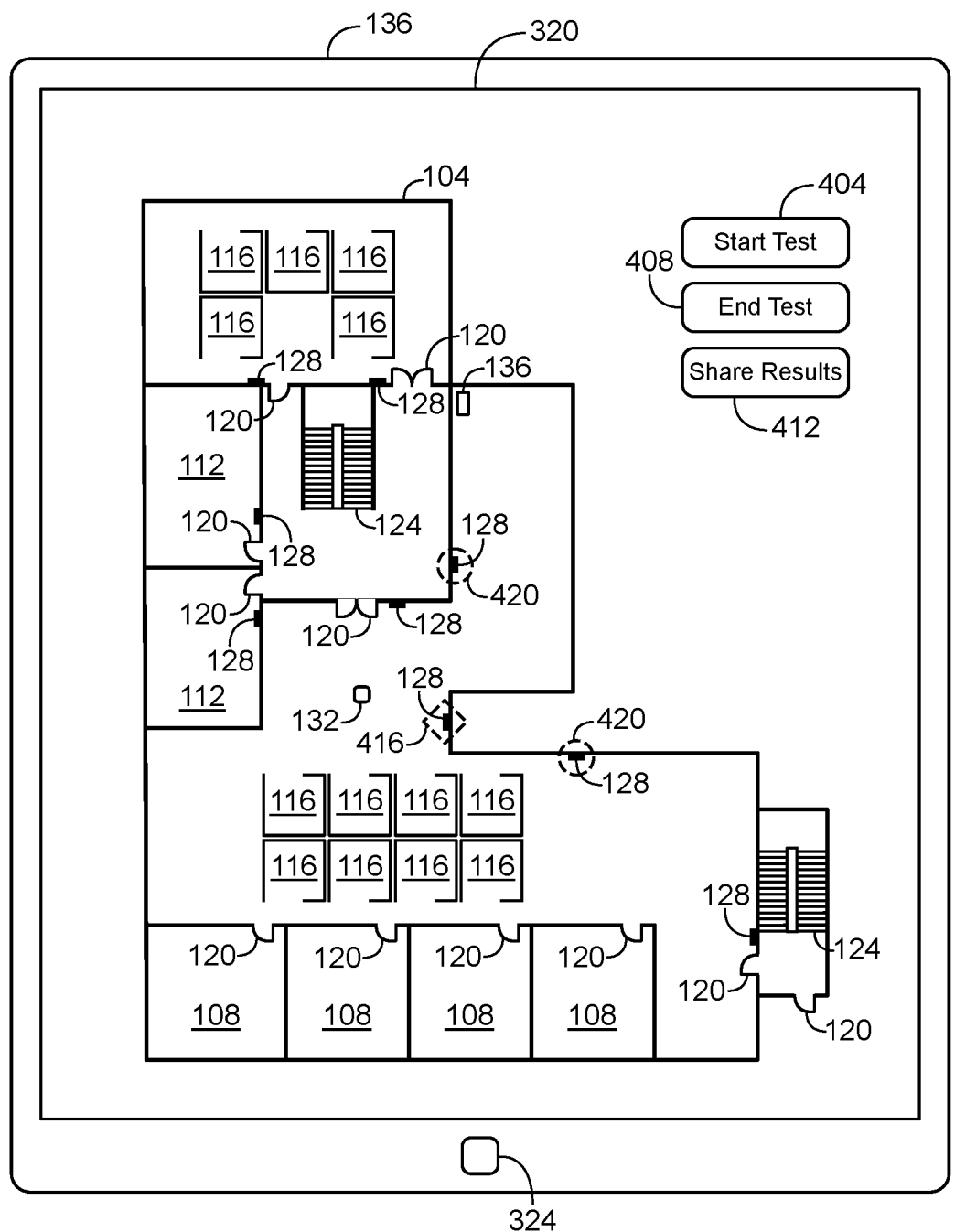
FIG. 4 is an exemplary terminal and reporting screen.

FIG. 4 illustrates an exemplary terminal 136 of an emergency lighting system. As can be seen, a terminal 136 may present, among other things, the status of one or more emergency lighting units 128, test results thereof, or both. In the embodiment of FIG. 4, a test result is shown in graphical form with a graphical representation of the environment 104 and the emergency lighting units 128 therein. As can be seen, a test result will typically comprise the status of each emergency lighting units 128 in an environment 104. A test result may also indicate the location of each emergency lighting unit 128.

One or more status indicators 416, 420 may be presented to indicate a current status of one or more emergency lighting units 128. For example, one or more first status indicators 416 may be presented in association with one or more emergency lighting units 128 that are in a failure condition. One or more distinct second status indicators 420 may be presented in association with one or more emergency lighting units 128 in a different condition, such as in an unknown condition or in a warning condition. An unknown condition may be indicated for emergency lighting units 128 that fail to communicate. A warning condition may be indicated for emergency lighting units 128 that are have characteristics that indicate a failure is imminent or about to occur. In general, an emergency lighting unit 128 that is not capable of illuminating or otherwise activating during an emergency, such as during a loss of external power, would be deemed to be in a failure condition. One or more status indicators may be used to indicate an emergency lighting unit 128 is in a nominal or normal operating condition. Alternatively, no status indicator may be presented in association with emergency lighting units 128 in a nominal condition.

Though shown in a graphical representation, it is noted that test results may be presented in tabular or other text form, with text indicating the status of the emergency lighting units 128 therein. The location of individual emergency lighting units 128 may also be presented textually, such as via a description or label.

Appropriate personnel may take action to remedy undesired operating conditions by reviewing the test results to determine which emergency lighting units 128 need attention, such as those in a warning, unknown, or failure operating condition. Remedies may include replacement or repair of batteries or other components or entire emergency lighting units 128. If all emergency lighting units 128 are found to be in a normal operating condition, the test result indicating the same may be kept for record keeping purposes. It is contemplated that such test result may be used to satisfy regulatory requirements.

As described above, a terminal 136 may also be used to control tests. As shown in FIG. 4 for example, the terminal 136 provides a number of controls 404, 408, 412 for controlling tests and sharing test results. Specifically, a "Start Test" button 404 and "End Test" button 408 are provided to start and end a test. In one or more embodiments, engaging a "Start Test" button 404 or the like would cause the terminal 136 to transmit a signal or command to initiate testing at the emergency lighting units 128. Engagement of an "End Test" button 408 or the like would end a test that is currently in progress, also by transmitting a corresponding signal or command. Once a test is completed, the results may be sent to other terminals 136 or devices, or printed, such as by engaging the "Share Results" button 412 or the like. Corresponding signals or commands would then be transmitted from the terminal 136.

Figure 5:
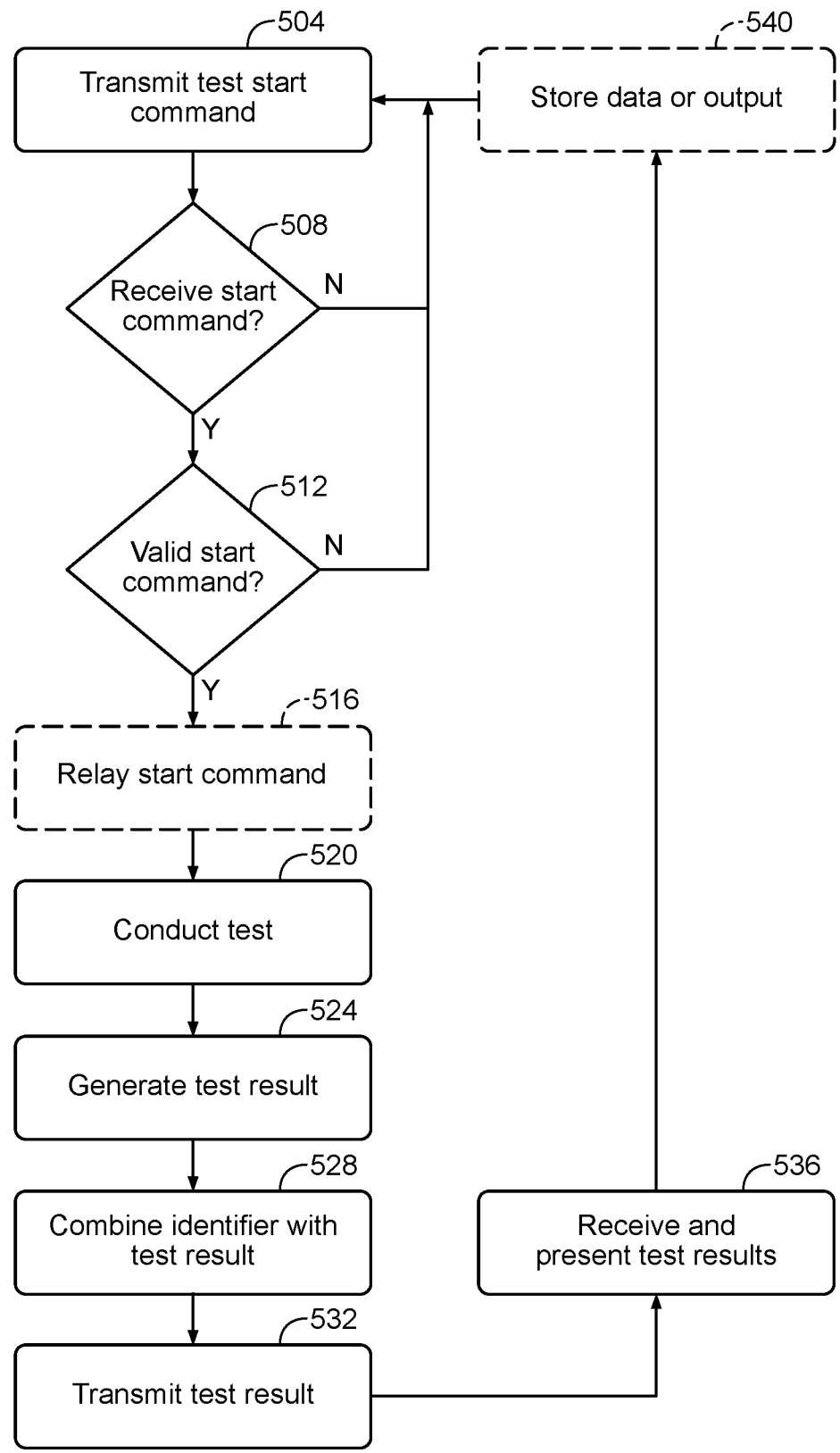
FIG. 5 is a flow diagram illustrating operation of an exemplary emergency lighting system.

FIG. 5 is a flow diagram illustrating operation of an exemplary emergency lighting system during testing. At a step 504, a start command may be transmitted, such as by a terminal, to initiate a test of the emergency lighting units of an emergency lighting system. A start test command may be broadcast to a plurality of emergency lighting units. At a decision step 508, it may be determined by one or more emergency lighting units, if a start command has been received. A start command may include a start command identifier, such as one or more sequences of characters or other data, that identifies it as a start command when received. To illustrate, a start command transmitted from a terminal may include a character string such as "START_COMMAND" or other predefined data to identify it as a start command.

If, at decision step 508, a transmission is received that is not a start command, an emergency lighting unit may continue to await new commands, as represented by the arrow returning to step 504 in FIG. 5. If it is determined at decision step 508, that a start command has been received, the start command may be validated at a decision step 512.

As indicated by the broken lines of decision step 512, validation may be optional in one or more embodiments. In general, validation will validate or authenticate a start command such that unauthorized start commands do not activate tests. Validation may occur in various ways. For example, a terminal may transmit a start command with a pre-shared key or code that is compared to a pre-shared-key or code stored on a memory device or controller of an emergency lighting unit. Alternatively, a terminal may transmit a username, password, or both along with a start command.

In yet another embodiment, a terminal may encrypt a start command, or portion thereof, such as with one or more encryption keys, or include a hash of a start command, or portion thereof, such as with a shared salt. It is contemplated that communication from a terminal may be encrypted or signed in various ways, which can then be used by an emergency lighting system's emergency lighting units to validate such communication, including start commands.

If an emergency lighting unit determines the start command is valid at decision step 512, the start command may be relayed or sent to other emergency lighting units at a step 516. In one or more embodiments, this may occur by retransmitting a received start command via a communication device of an emergency lighting unit. Relaying start commands can be advantageous in environments where a terminal's start command may not be received by all emergency lighting units a user wishes to test. For example, a start command may need to be relayed if it is to reach emergency lighting units on multiple floors of a building. It is contemplated that a gateway may be used to facilitate transmission of a start command (or other communication). As indicated by the broken line depiction of step 516, relaying a start command may be optional in one or more embodiments. If a start command is not valid at decision step 512, an emergency lighting unit may continue to await additional commands.

At a step 520, testing may commence at an emergency lighting unit. In general, a test will discern whether an emergency lighting unit will be operational in an emergency, as will be described further below. A test result, including the operational condition of the tested emergency lighting unit, will be generated by the emergency lighting unit, at a step 524, based on the test. For example, a test result may indicate whether one or more emergency lighting units are in a nominal, failure, unknown, or warning condition. A test result may also include other information, such as one or more timestamps (e.g., test start and test completion times), a terminal identifier uniquely identifying the terminal that transmitted the start command, a user identifier identifying the user logged in to the terminal that transmitted the start command, or other information.

A fixture identifier of an emergency lighting unit may be combined with its test result at a step 528 to identify the emergency lighting unit to which the test result applies. Typically, the identifier will be a unique identifier that allows a particular emergency lighting unit to be identified. At a step 532, the test result, including the associated emergency lighting unit identifier, may be transmitted from the emergency lighting unit, via a communication device thereof.

Individual test results will typically be transmitted by a plurality of emergency lighting units to one or more terminals for aggregation and presentation to one or more users at a step 536. An exemplary presentation of aggregated test results is illustrated in FIG. 4. It is contemplated that test results may be presented as they are received, according to a set refresh period, or once a threshold number of test results are received.

Test results may be stored at a step 540, such as by or at one or more terminals. This generates a record of test results that may be subsequently retrieved. It is contemplated that a terminal may transmit test results to a remote database server or other storage device for storage. Typically, test results will be stored in a schema that facilitates retrieval or queries of specific or bulk test results. A terminal may be used to retrieve or query stored test results. For example, a terminal may be used to query test results for a particular time period, that exhibit particular operating condition(s), or both.

It is contemplated that testing may occur in continuously or automatically on a predefined schedule or period. For example, in one or more embodiments, a terminal may be configured to transmit test start commands according to a predefined schedule or period. Alternatively, a test start command may instruct emergency lighting units to continuously or periodically test and report operating conditions. Real time or close to real time reporting can be obtained in this manner. Emergency lighting units may be configured to continuously test and report operating conditions. It is contemplated that operating conditions may be only reported when changed in some embodiments.

Figure 6:
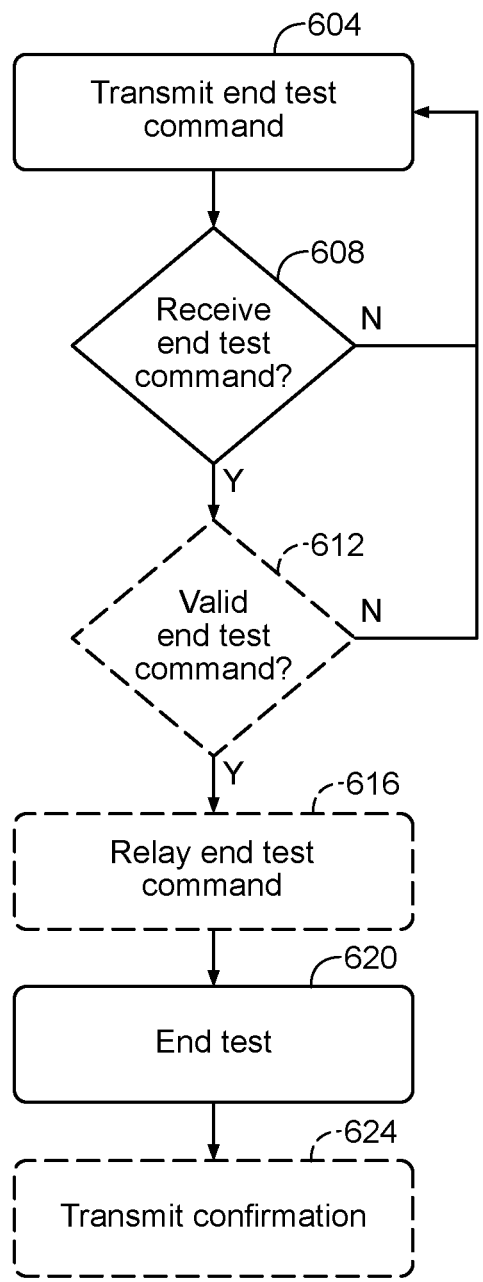
FIG. 6 is a flow diagram illustrating operation of an exemplary emergency lighting system.

FIG. 6 illustrates operation of an exemplary emergency lighting system when testing is to be aborted or ended. This may occur when a user engages an "End Test" button, such as described above. At a step 604, an end test command may be transmitted from a terminal. An end test command may be broadcast to a plurality of emergency lighting units. At a decision step 608, an emergency lighting unit may determine whether a received transmission is an end test command. A transmission may be deemed an end test command when it possesses a particular sequence of characters (e.g., "END_TEST") or data, such as described above with regard to the start test command.

If an end test command is not received at decision step 608, emergency lighting units may continue to await new commands, as represented by the return to step 604 in FIG. 6. If an end test command is received, the end test command may be validated at a decision step 612. Validation of an end test command may occur in the same manners as described above with regard to validation of start test commands. For example, an end test command may be validated by a pre-shared key, hash, username, password, encryption, or signature. It is noted that validation may be optional in one or more embodiments, as illustrated by the broken line depiction of decision step 612.

Assuming validation occurs, if the end test command is not valid, the emergency lighting units may continue to await new commands, as represented by the return to step 604 in FIG. 6. If the end test command is validated, the end test command 616 may be relayed or sent from the emergency lighting unit that received it, such as to ensure all emergency lighting units receive the end test command. Relaying of an end test command can aid in ensuring the command reaches all desired emergency lighting units. As indicated by the broken lines, relaying the end test command may be optional in one or more embodiments.

At a step 620, any ongoing test may be aborted or otherwise ended. Typically, this will place an emergency lighting unit in the condition it was prior to the test. For instance, any switches that were actuated may be actuated to their earlier position or state. Thereafter, a confirmation may be transmitted from an emergency lighting unit, at a step 624, to indicate that testing has indeed ended at the particular emergency lighting unit. The confirmation will typically include the unique fixture identifier for the emergency lighting unit transmitting the confirmation. A user identifier and other information may be included in the confirmation as well. Transmission of a confirmation at step 624 is optional, as indicated by the broken line depiction thereof.

Figure 7:
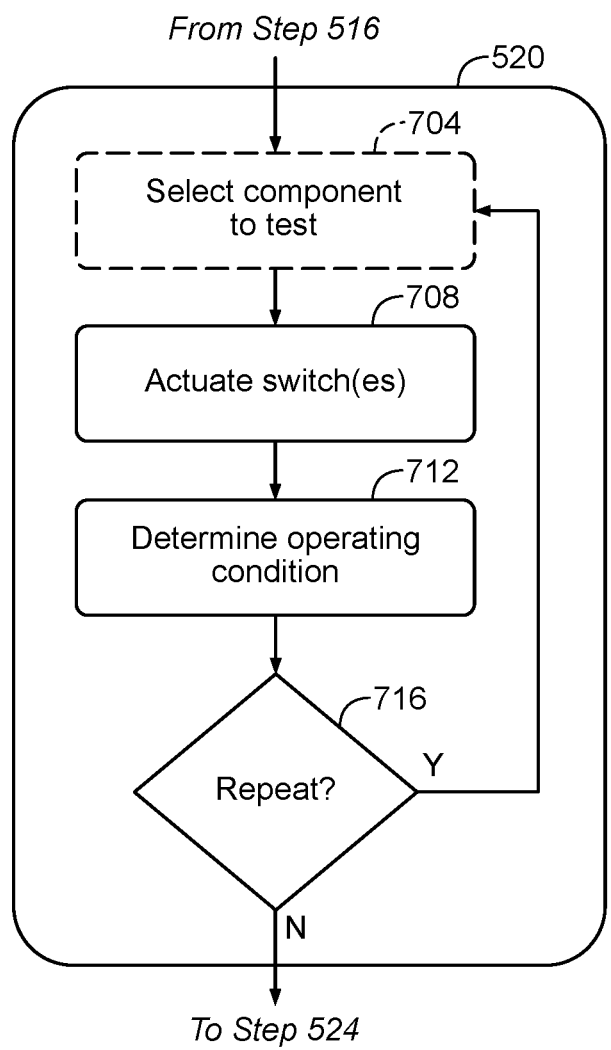
FIG. 7 is a flow diagram illustrating testing with an exemplary emergency lighting system.

FIG. 7 is a flow diagram illustrating operation of an exemplary emergency lighting system when a test is conducted. Typically, individual tests will be conducted at a plurality of individual emergency lighting units. At a step 704, one or more particular components may be selected for testing. For example, a battery, lighting device, power supply, or various subsets thereof may be selected for testing. The selection may be defined by information in a test start command from a terminal. For example, one or more test types may be specified in a test start command indicating whether a predefined subset of components or all components should be tested. Each test type may be associated with one or more switches and switch states or positions. In this manner, a test of a particular type may be conducted by actuating the associated one or more switches.

As can be seen by the broken line depiction of step 704, selection of a component or components may be optional in one or more embodiments. In one or more embodiments, the same predefined set of one or more components may be tested thus negating the need to select or otherwise specify which components of an emergency lighting unit are to be tested. For instance, in one embodiment, only the battery of an emergency lighting system's emergency lighting units may be tested. Alternatively, only the lighting device may be tested in some embodiments. In yet another exemplary embodiment, only the battery and lighting device of each emergency lighting unit may be tested.

At a step 708, one or more switches may be actuated to disconnect or disable one or more components. Thereafter, the operating condition of the emergency lighting unit being tested can be determined at a step 712. To illustrate with reference to FIG. 2, one or more switches 232 may be actuated to disconnect a power supply 224, power source 228 or both to verify that a lighting device 212 is still operational via power from a battery 220. In another test, one or more switches 232 may be actuated to activate a lighting device 212 to verify that it illuminates to a particular luminosity, or to initiate power output from a battery 220 to verify that it has a particular power output. Likewise, one or more switches 232 may be actuated to activate various other components, such as a communication device 208, to verify their operation. Though shown externally, it is contemplated that one or more switches 232 may be internal to the components of an emergency lighting unit.

As stated, one or more sensors 216 may be utilized to determine the operating condition of an emergency lighting unit during a test. It is contemplated that various sensors 216 may be provided with an emergency lighting unit 128. For example, an emergency lighting unit 128 may comprise one or more voltage, current, light, or other electromagnetic sensors 216, or various subsets thereof. During a battery test for example, one or more sensors 216 may measure the voltage output, current output, or other characteristic of a battery's output to determine its operating condition. A power supply's output may be tested in a similar manner.

During a lighting device test, a light sensor may measure the light output of a lighting device 212 to determine its operating condition. Components may be tested indirectly as well. For example, a sensor 216 may measure the voltage draw, current draw, or both of a lighting device 212 to determine its operating condition.

At step 712, the operating condition of a component may be categorized into a predefined set of operating conditions, such as the nominal, warning, or failure operating conditions disclosed above. In one or more embodiments, a controller 204 will receive measurements or other sensor information from one or more sensors 216 and categorize the sensor information based on one or more predefined thresholds or ranges associated with each operating condition. To illustrate, a nominal operating condition may have a first luminosity threshold or range, a warning operating condition may have a second distinct luminosity threshold or range, and a failure operating condition may have a third distinct luminosity threshold or range, for a lighting device 212 test. Similarly, a battery or power supply test may have individual distinct voltage ranges, current ranges, or both for each of its operating conditions. It is contemplated that only a normal and failure operating condition may be provided in some embodiments. In one or more embodiments, the thresholds or ranges may decrease from nominal to warning to failure operating conditions.

At a decision step 716, one or more tests can be repeated one or more times if desired. For example, a battery test may be repeated to obtain a mean value or median value for determining the operating condition at step 712. This can provide increased accuracy. Typically, a test will only be conducted a single time per start test command. Once one or more tests are complete the operating condition determined at step 712 may be used in generating a test result at step 524 of FIG. 5, such as shown.

Though its operation is illustrated in a particular sequence with regard to FIG. 5-7, it is noted that in various embodiments of the emergency lighting system, the above steps may occur in a different order. In addition, though particular steps are illustrated as optional by their depiction in broken lines, it is noted that one or more of the other steps may be made optional in various embodiments of the emergency lighting system.

It is noted that, in some embodiments, one or more tests may be conducted without receipt of a test start command. For example, if a sensor should detect a warning or failure operating condition, a test result indicating the same may be automatically transmitted to one or more terminals. In this manner, operating conditions requiring attention may be readily monitored.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. An emergency lighting system for a building comprising:
   one or more terminals that send one or more commands and receive a plurality of test results; and
   a plurality of emergency lighting units comprising:
   one or more lighting devices;
   one or more wireless communication devices that wirelessly receive the one or more commands and one or more relayed commands, the one or more relayed commands generated based on the one or more commands, and wirelessly relay the one or more relayed commands to one or more remote emergency lighting units;
   one or more sensing devices that initiate at least one test to determine an operating condition of the one or more lighting devices in response to receipt of the one or more commands, the at least one test also initiated by the one or more sensing devices in response to receipt of the one or more relayed commands;
   wherein the one or more wireless communication devices wirelessly transmit one or more test results comprising the operating condition to the one or more terminals;
   wherein the one or more sensing devices detect one or more environmental conditions and activate at least one of the one or more lighting devices in response;
   wherein the one or more terminals present the one or more test results from the plurality of emergency lighting units to a user.

2. The emergency lighting system of claim 1, wherein the plurality of emergency lighting units further comprise a power supply and one or more batteries, wherein the one or more communication devices and the one or more sensing devices are powered by at least one of the one or more batteries when determining the operating condition and wirelessly transmitting the one or more test results.

3. The emergency lighting system of claim 1, wherein one of the one or more commands cause the one or more sensing devices to initiate the at least one test to determine the operating condition of the one or more lighting devices according to a particular schedule.

4. The emergency lighting system of claim 1, wherein the operating condition is selected from the group consisting of a normal operating condition, a warning operating condition, a failure operating condition, and an unknown operating condition.

5. The emergency lighting system of claim 1, wherein the plurality of emergency lighting units authenticate the one or more commands before relaying the one or more commands.

6. The emergency lighting system of claim 1 further comprising one or more storage devices, wherein the one or more terminals store the one or more test results in a database on the one or more storage devices.

7. The emergency lighting system of claim 1, wherein the plurality emergency lighting units comprise one or more controllers that validate the one or more commands.

8. An emergency lighting system for a building comprising:
- a plurality of emergency lighting units comprising:
  - one or more lighting devices;
  - one or more wireless communication devices that wirelessly receive one or more commands and one or more relayed commands, the one or more relayed commands generated based on the one or more commands, and wirelessly relay the one or more relayed commands to one or more remote emergency lighting units;
  - one or more sensing devices that initiate at least one test to determine an operating condition of the one or more lighting devices in response receipt of the one or more commands, the at least one test also initiated by the one or more sensing devices in response to receipt of the one or more relayed commands;
  - wherein the one or more sensing devices detect one or more environmental conditions and activate at least one of the one or more lighting devices in response;
  - wherein the one or more wireless communication devices wirelessly transmit one or more test results comprising the operating condition.

9. The emergency lighting system of claim 8 further comprising one or more terminals comprising a display, wherein the one or more terminals receive and present a plurality of test results once a plurality of the one or more test results have been received from the plurality of emergency lighting units.

10. The emergency lighting system of claim 8, wherein one of the one or more commands cause the one or more sensing devices to initiate the at least one test to determine the operating condition of the one or more lighting devices according to a particular schedule.

11. The emergency lighting system of claim 8, wherein at least one of the plurality of emergency lighting units authenticates the one or more commands before relaying the one or more commands.

12. The emergency lighting system of claim 8, wherein the operating condition is selected from the group consisting of a normal operating condition, a warning operating condition, a failure operating condition, and an unknown operating condition.

13. The emergency lighting system of claim 8 further comprising one or more storage devices, wherein the one or more test results are stored in a database on the one or more storage devices.

14. The emergency lighting system of claim 8, wherein the plurality of emergency lighting units further comprise a power supply and one or more batteries, wherein the one or more communication devices and the one or more sensing devices are powered by at least one of the one or more batteries when determining the operating condition and wirelessly transmitting the one or more test results.

* * * * *